3,021,219
PROCESS FOR PRESERVING BAKED PRODUCTS

Daniel Melnick, Teaneck, N.J., assignor to Corn Products Company, New York, N.Y., a corporation of Delaware
No Drawing. Filed Nov. 27, 1959, Ser. No. 855,501
9 Claims. (Cl. 99—90)

This invention relates to a process for preventing mold spoilage of baked products.

Baked products, capable of supporting mold growth, are characterized by containing at least 20% moisture and at least 1% fat.

The susceptibility of baked products to mold spoilage is well known and constitutes one of the major problems in the baking industry. In this connection, one of the most pressing problems relates to the susceptibility of sliced baked products to mold spoilage since the inner portions of these foods are more favorable for supporting mold growth than are the outer surfaces. This is apparent from studies of the rapidity with which mold growth occurs in the crumb as compared to that on the crust of bread. Thus it may be concluded that the slicing operation is responsible for introducing a mold inoculum into the inner portions of these foods and in these areas rampant mold growth occurs causing the consumer to reject the product. Furthermore, the solution of this problem is aggravated by the fact that mold spores are found in bakeries, the spores being suspended in the air and deposited on the equipment.

It is not surprising therefore that the industry should spend a considerable amount of time and money in an effort to solve or alleviate this problem. One of the most common methods now employed is to incorporate sodium propionate in baked products to prevent spoilage and thus to extend their shelf life. While the use of sodium propionate does extend the shelf life of the baked goods from hours to several days, nevertheless its use has not provided a complete or entirely satisfactory solution to this problem.

Other means of solving this problem, such as the incorporation of sorbic acid in the dough, have been attempted and have proven unsuccessful because of interference with yeast fermentation.

It is therefore an object of this invention to provide a process for producing baked products, normally capable of fostering mold growth, which are resistant to mold growth.

Another object of this invention is to provide a process for producing sliced baked products, normally capable of fostering mold growth, which are more resistant to mold spoilage than other sliced products not produced in accordance with this invention.

These and other objects will be apparent from the following detailed description.

According to my invention there is provided a process for protecting baked products from mold spoilage which comprises contacting the dough with a vegetable oil or with a solid fat containing sorbic acid in an amount of about 0.5 to 10% by weight. Preferably I prefer to use about 2 to 8% sorbic acid by weight. The sorbic acid may be applied as a solution or as a suspension.

In a preferred process of my invention the sorbic acid is applied to the baking pan in a layer of from about 0.1 mm. to about 1 mm. in depth. At the higher concentrations, viz., 2–10% most of the sorbic acid will be in suspension when the pan grease is at room temperature or when the shortening base is raised to a temperature just above the melting point. However, during the baking operation temperatures in excess of 200° F. are attained and at these temperatures practically all the sorbic acid in the pan grease goes into solution. When sorbic acid is used as a suspension in the pan grease in excess of 10%, the under surfaces of the final baked product will show an undesirable residuum of white sorbic acid crystals. The use of sorbic acid in concentration of less than 0.5% in the pan grease is not adequate to protect these vulnerable lower crust surfaces from mold spoilage.

It should be emphasized that of all the crust surfaces of a baked product that which has been in contact with the baking pan is most vulnerable to mold spoilage. This is attributed to the fact that these lower crust surfaces exhibit, in contrast to the upper crust layer, a wide-open porous structure.

When the baked product is removed from the oven, in accordance with a preferred feature of this invention, the upper crust may be sprayed or painted with a sorbic acid solution to protect this surface. Any solvent or combination of solvents in which sorbic acid exhibits a solubility of at least about 0.5% and preferably at least about 2% may be used in preparing the sorbic acid solution for treating the upper crust. For this purpose, a solution of sorbic acid in propylene glycol or in a propylene glycol:water mixture has been found to be particularly suitable.

In another preferred procedure of my invention the cutting blades used in slicing the baked products are allowed to run through a solution of sorbic acid before the food products are cut.

Any solvent in which sorbic acid exhibits a solubility of at least about 0.5% and preferably at least of about 2% may be used in preparing the sorbic acid solution for treating the cutting blades. Solvents such as water, vegetable oil (liquid or hydrogenated), propylene glycol or ethanol may be used. Sorbic acid is soluble in these solvents at room temperature to the extent of 0.2%, 0.6%, 5.5%, 12.5% by weight, respectively. Increasing the temperature of the solvents will increase significantly the solubility of sorbic acid in them. Thus, in the case of the vegetable oils the solubility of sorbic acid is increased to about 8% by raising the temperature from 68° F. to 200° F. Thus, in certain operations where heating of the sorbic acid solution is no deterrent, it is satisfactory to use sorbic acid in suspension and depend upon the subsequent heating operation to bring this sorbic acid into solution. Combinations of solvents are also effective and preference is for those combinations which still exhibit a relatively high solubility for sorbic acid, about 2% by weight or more of sorbic acid in solution. The sorbic acid need not be present in the solvents in concentration in excess of 10% by weight, preferably not in excess of 8% by weight.

The composition of the blades used for preparing the sliced baked products of the present invention should be one which does not react with sorbic acid. Stainless steel, steel hard-surfaced with chrome, or a plastic, such as nylon, may be used for this purpose. Slicing machines for bread come in two basic designs differing essentially in the mode of slicing. The so-called reciprocating slicer makes use of slicing blades mounted in two frames which move up and down at high speed in opposite directions, slicing the bread as it is gently fed through the moving blades. In this operation the sorbic acid in a solvent, viz., 5% in propylene glycol, is fed on to the blades in drop-wise fashion from a reservoir mounted above the blades. Another type of slicer is the so-called band slicer. These comprise endless band knives which are run at high speed through the baked product to be sliced. In this operation the sorbic acid in solution, viz., 5% in propylene glycol, is held in a well through which the endless band knives pass thereby picking up the fungistatic solution continuously and depositing it into the exposed inner portions of the baked products.

The slicing blades introduce into the inner portion of the foods a small deposit of sorbic acid, thereby making these hitherto vulnerable areas more resistant to mold spoilage. The sorbic acid introduced into the product and applied to the outer surfaces of the sliced foods resists organoleptic detection.

Subsequent to the slicing operation the baked products of this invention preferably are wrapped to prevent further contamination of the foods with mold spores in the air.

Among the distinct advantages of my process is the use of one food to protect another. All of the food products in this invention contain fat, the fat consisting of fatty acids in triglyceride combination. During digestion this fat is hydrolyzed to provide free fatty acids of different degrees of unsaturation; these are then metabolized to carbon dioxide and water. Sorbic acid is also a fatty acid, a $C_6$ unsaturated fatty acid and also is metabolized to carbon dioxide and water. Another distinct advantage of my process is that it is easily adaptable to conventional baking methods.

Whereas the above mentioned process is effective in protecting baked products such as sliced pound cake, sliced fruit cake, it is particularly effective and useful in protecting sliced yeast-raised bread and rolls, particularly when these products are exposed to high humidity. The present process is the most economical way for protecting the latter type of baked products against mold spoilage when sorbic acid is used as the fungistatic agent. When sorbic acid is introduced directly into the dough of a yeast-raised product in concentrations of 0.05% or greater, expressed on the flour basis, it interferes with yeast fermentation. Lower concentrations of sorbic acid fail to give significant fungistatic protection to sliced yeast-raised baked products. With the higher concentrations of 0.05% or greater, dough maturation is impaired, proofing time is extended, and baked products low in volume and poor in grain and texture are obtained. By the present process, all vulnerable areas of the yeast-raised baked products are protected with sorbic acid, said sorbic acid being introduced so late in the baking operation that no interference with yeast fermentation occurs.

For a more detailed description of the present invention, reference is now made to the following examples. Obviously, many modifications are available to those skilled in the art and this disclosure is limited only by the spirit and scope of the appended claims.

*Example I*

Conventional yeast-raised bread was prepared using the sponge dough method. The bread contained 35% moisture and 3% fat. The baking pans had been greased by brushing the bottom and walls with a shortening of 112° F. melting point, heated to about 120° F. and containing a total of 6% sorbic acid, 2% in solution and the remaining 4% in suspension. The top crusts of the bread were "washed" (actually painted) with a 5% solution of sorbic acid in propylene glycol as the breads came from the oven. The cooled baked breaks were then sliced using endless band knives which passed through a well containing 5% sorbic acid in propylene glycol solution. The sliced breads were wrapped in moisture-proof, heat-sealable cellophane. It required fully 10 days at room temperature before the breads exhibited the first evidence of mold spoilage, noted at the "break" on the top crust and in the crumb of some slices.

The control breads duplicated the above, but were baked in pans greased with the melted fat alone, given a simple water "wash" as they left the oven, and sliced without benefit of the sorbic acid treatment of the band knives. These control breads also wrapped in cellophane and stored at room temperature, exhibited the first evidence of mold spoilage after 4 days of storage; mold growth was noted at this time only in the crumb of some slices. The control breads which were similarly stored, but not sliced, showed the first evidence of mold spoilage after 7 days; mold growth occurred at the break on the top crust and on the wall crust surfaces.

*Example II*

The bread of Example I, but without the sorbic acid wash of the upper crust surfaces, was prepared. These sliced breads required 8 days at room temperature before the breads showed the first signs of mold growth. This occurred at the "break" on the top crust.

*Example III*

The bread of Example I, but without the greasing of the pans with the shortening containing the sorbic acid and without the sorbic acid wash of the upper crust surface, was prepared. Silicone-coated pans, requiring no greasing, were employed to hold the dough during proofing and baking. Thus, the only sorbic acid treatment in this case was passage of the band knives through a well containing the sorbic acid solution, 5% in propylene glycol. These sliced breads required 7 days for the first signs of mold growth to become apparent.

*Example IV*

Conventional marble pound cake was prepared from a combination of white and chocolate cake batters. The cakes contained 29% moisture and 15% fat. The baking pans had been greased by brushing the bottom and walls with a shortening of 112° F. melting point, heated to about 120° F. and containing 2% sorbic acid in solution. The top crusts of the pound cakes were "washed" with an 0.5% solution of sorbic acid in water at about 120° F. as the cakes were removed from the oven. The cooled cakes were then sliced in a reciprocating slicing machine, the blades of which had fed on to them in a controlled drop-wise fashion the same sorbic acid solution in water described above. The individual slices of pound cake were wrapped in moisture-proof, heat-sealable cellophane. It required 10 days at room temperature before the cake slices exhibited the first evidence of mold spoilage. The control cake slices, which were similarly prepared but without sorbic acid treatment, showed the first signs of becoming moldy after 6 days of storage. In both the treated and control cakes, mold growth was first detected on the crumb surface. The non-sliced control pound cake exhibited the first evidence of mold spoilage after 8 days of storage.

What I claim is:

1. A process for preventing mold spoilage of a baked product containing at least 20% moisture and at least 1% fat, the lower crust surfaces of said baked product being particularly vulnerable to mold spoilage comprising bringing the lower surfaces of a dough into contact with a fat containing about 0.5 to 10% by weight of sorbic acid, placing said dough in a heating zone, heating said dough to baking temperatures so as to solubilize the sorbic acid, maintaining the dough at said baking temperatures in the heating zone until the dough is baked and then removing the baked product from the heating zone.

2. A process for preventing mold spoilage of a baked product containing at least 20% moisture and at least 1% fat, the lower crust surfaces of said baked product being particularly vulnerable to mold spoilage comprising bringing the bottom surfaces of a dough into contact with a fat containing about 0.5 to 10% by weight of sorbic acid, placing said dough in a heating zone, heating said dough to baking temperatures so as to solubilize the sorbic acid, maintaining the dough at said baking temperatures in the heating zone unit the dough is baked, removing the baked product from the heating zone, applying a solution containing at least about 0.5% sorbic acid to about 10% by weight of sorbic acid to all exposed surfaces of said baked product.

3. A process according to claim 2 wherein said fat contains about 2 to 8% by weight of sorbic acid and said solution contains about 2 to 8% sorbic acid.

4. A process for preventing mold spoilage of a sliced baked product containing at least 20% moisture and at least 1% fat, the lower crust surfaces of said baked product being particularly vulnerable to mold spoilage comprising bringing the bottom surfaces of a dough into contact with a fat containing about 0.5 to 10% by weight of sorbic acid, placing said dough in a heating zone, heating said dough to baking temperatures so as to solubilize the sorbic acid, maintaining the dough at said baking temperatures in the heating zone until the dough is baked, removing the baked product from the heating zone, applying a solution containing at least about 0.5% sorbic acid to about 10% by weight of sorbic acid to all exposed surfaces of said baked product, sending said baked product through a cutting zone so as to cut said product into slices and substantially simultaneously introducing into the inner portion of said sliced product, a small but effective amount of a solution containing between 0.5 to 10% by weight of sorbic acid.

5. A process according to claim 4 wherein said fat contains about 2 to 8% by weight of sorbic acid and said solution contains about 2 to 8% by weight of sorbic acid.

6. A process according to claim 5 wherein said baked product is a yeast-raised baked product.

7. A process according to claim 1 wherein said fat contains about 2 to 8% by weight of sorbic acid.

8. A process according to claim 1 wherein said baked product is a yeast-raised baked product.

9. A process according to claim 2 wherein said product is a yeast-raised baked product.

References Cited in the file of this patent

UNITED STATES PATENTS

| | | |
|---|---|---|
| 1,686,968 | Harber | Oct. 9, 1928 |
| 2,154,449 | Hoffman et al. | Apr. 18, 1939 |
| 2,190,714 | Hoffman et al. | Feb. 20, 1940 |
| 2,379,294 | Gooding | June 26, 1945 |
| 2,684,177 | Kennedy | July 20, 1954 |

FOREIGN PATENTS

| | | |
|---|---|---|
| 455,846 | Great Britain | Oct. 28, 1936 |